United States Patent
Sasaki

(10) Patent No.: US 6,549,715 B1
(45) Date of Patent: Apr. 15, 2003

(54) METHOD FOR ESTIMATING AVAILABLE RECORD TIME AND A RECORDING MEDIUM PROCESSING APPARATUS

(75) Inventor: Dai Sasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/225,122

(22) Filed: Jan. 4, 1999

(30) Foreign Application Priority Data

Jan. 6, 1998 (JP) .......................................... 10-001118

(51) Int. Cl.[7] ................................................ H04N 5/76
(52) U.S. Cl. ........................ 386/46; 386/125; 360/137; 369/292; 348/231.1
(58) Field of Search ................................ 386/1, 45, 46, 386/125–126; 360/69, 71, 92, 94, 132, 137; 369/292; 348/231.1, 231.2; H04N 5/76, 5/92, 9/79, 5/225

(56) References Cited

U.S. PATENT DOCUMENTS

| | | | | |
|---|---|---|---|---|
| 5,774,314 A | * | 6/1998 | Eggen et al. ................ | 360/137 |
| 5,943,468 A | * | 8/1999 | Takayama ................... | 386/113 |
| 6,101,070 A | * | 8/2000 | Oguro ........................ | 360/132 |
| 2002/0021886 A1 | * | 2/2002 | Nakajima et al. ............ | 386/46 |

FOREIGN PATENT DOCUMENTS

| | | |
|---|---|---|
| EP | 0 452 854 | 10/1991 |
| EP | 0 580 434 | 1/1994 |
| EP | 0 760 511 | 3/1997 |
| EP | 0 795 868 | 9/1997 |
| EP | 0 851 421 A2 * | 7/1998 ........... G11B/27/11 |
| JP | 04 360087 | 12/1992 |

OTHER PUBLICATIONS

Patent Abstracts of Japan vol. 018, No. 638 (P–1837), Dec. 5, 1994 & JP 06 243661 A (Alps Electric Co Ltd), Sep. 2, 1994.

* cited by examiner

Primary Examiner—Thai Tran
(74) Attorney, Agent, or Firm—Frommer Lawrence & Haug LLP; William S. Frommer; Glenn F. Savit

(57) ABSTRACT

The record position information of broadcasts is used to evaluate the blank length from the tape head up to the record start position of the first broadcast. The blank length from the record end position of the broadcast up to the record start position of the next broadcast is evaluated. The blank lengths are compared up to the last broadcast sequentially to detect the longest blank section. The longest blank section is compared with the blank lengths from the record end position of the last broadcast up to the tape end, and the longer one is discriminated to be the blank section of the longest blank length. The maximum available record time which depends on the recording mode is calculated from the longest blank length, and it is displayed. The maximum available record time of the recording medium can readily be detected.

40 Claims, 9 Drawing Sheets

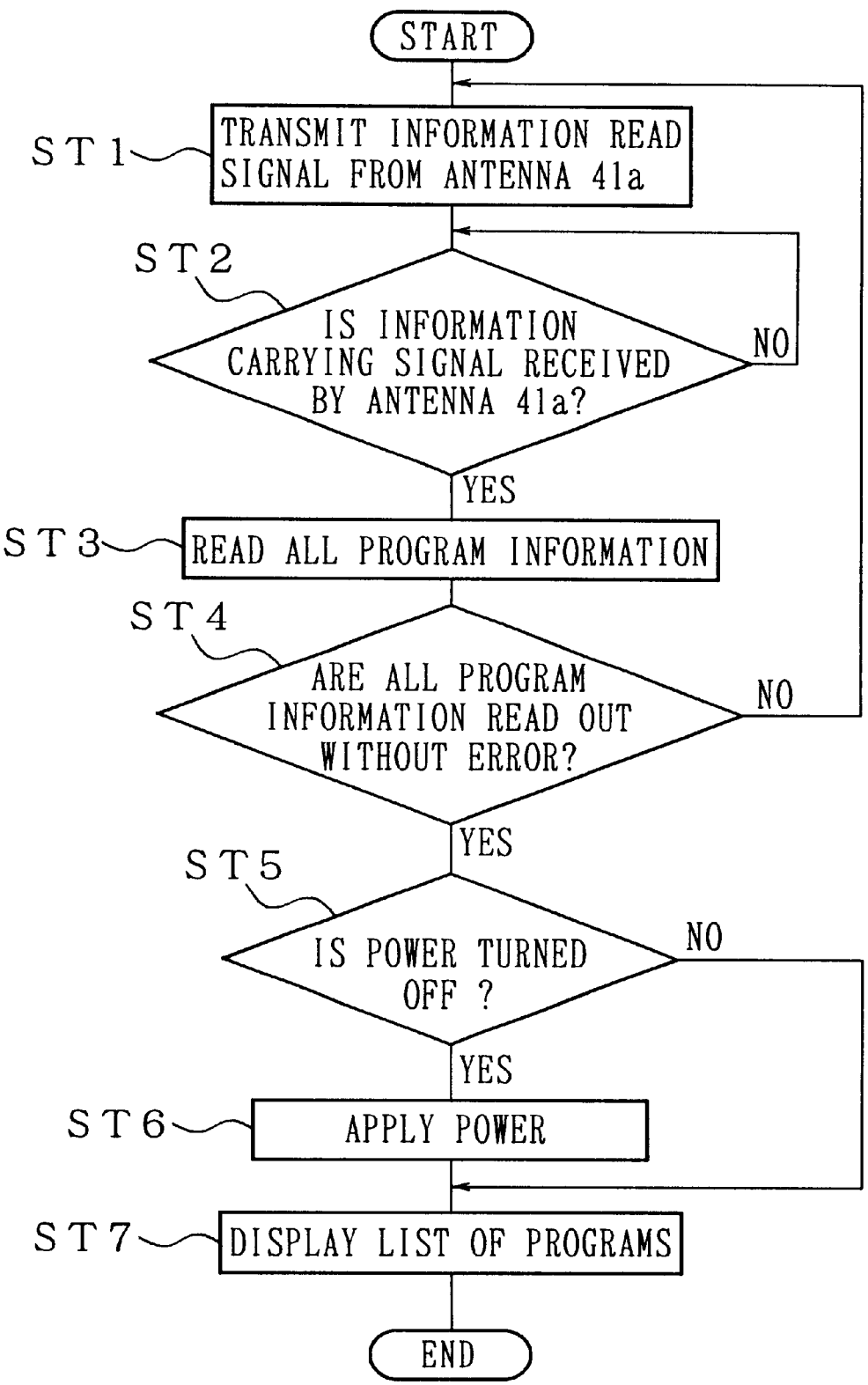

METHOD FOR ESTIMATING AVAILABLE RECORD TIME AND A RECORDING MEDIUM PROCESSING APPARATUS

BACKGROUND OF THE INVENTION

The present invention relates to a method for estimating the available record time and a recording medium processing apparatus. More particularly, it relates to a method and an apparatus which are designed to discriminate as blank sections the positions of recording medium where no events are recorded and the record positions of events that have been judged to be negligible, and display the available record time of the longest blank section among the blank sections as the maximum available record time of the recording medium.

In recording an event on a recording medium, e.g., in recording a broadcast on a video cassette, it is the conventional method to confirm prior to the commencement of recording of the broadcast as to how long available record time is there so that the intended broadcast may be recorded without being cut off.

This estimation of available record time is carried out by utilization of the value of tape counter of the recording medium processing apparatus, e.g., video tape recorder, which records events on the recording medium and reproduces recorded events from the recording medium, or by utilization of the tape position which is detected at the setting of the video cassette on the video tape recorder.

In the case of the detection of tape position, unless the video cassette is loaded to the video cassette recorder, the tape position cannot be detected and accordingly the available record time cannot be estimated. In case the video cassette is taken out of the video tape recorder, the available record time cannot be estimated correctly from the counter value unless the counter value is reset on the assumption that the tape position is the tape head.

In any case, the estimated available record time is the time when the tape runs from the current tape position to the tape end position. On this account, even if an already recorded broadcast is judged to be negligible and the record position of the broadcast is converted to an available recording area, the available record time will be estimated shorter when the unrecorded section from the tape position at the end of recording of the broadcast up to the tape end is small, and the broadcast cannot be recorded efficiently on the recording medium.

Accordingly, it is the object of the present invention to provide a method for estimating the available record time and a recording medium processing apparatus. The method and the apparatus are capable of readily detecting the maximum available record time of a recording medium.

SUMMARY OF THE INVENTION

According to a first aspect of the present invention, we provide a method for estimating available record time on a recording medium, said method comprising the steps of calculating the lengths of a plurality of blank sections on said recording medium, selecting the longest blank section among the blank sections, and determining the length of the longest blank section to be the maximum available record time of said recording medium.

According to a second aspect of the invention, we provide a recording medium processing apparatus for recording or reproducing events on a recording medium comprising control means for estimating the available record time on said recording medium, wherein said control means calculates the lengths of a plurality of blank sections on said recording medium and it selects the longest blank section among the blank sections, and then it determines the length of the longest blank section to be the maximum available record time of said recording medium.

According to this invention, the positions of recording medium where no events are recorded and the record positions of events that have been judged to be negligible, e.g., the positions of video cassette where no broadcasts are recorded and the record positions of broadcasts that have been judged to be negligible, are discriminated as blank sections, and the longest blank section is detected among these blank sections. The available record time of the detected longest blank section is determined to be the maximum available record time of the recording medium. A memory card which records the record position information of the recorded broadcasts is attached to the video cassette. When such the video cassette is brought close to the recording medium processing apparatus, i.e., video tape recorder, or when such the video cassette is loaded to the video tape recorder, or when a certain key operation or the like is implemented following the load of the video cassette, the record position information is read out of the memory card. Then, the maximum available record time is estimated based on the record position information and displayed. The amount of available record time is dependent on the recording mode, e.g., standard recording mode or long-time recording mode.

A further understanding of the nature and advantages of the invention may be realized by reference to the following portions of the specification and drawings.

BRIEF DESCRIPTION OF THE DRAWING

FIG. 12 is a flowchart of steps in which a manual positioning-prompted display operation is carried out;

DETAILED EXPLANATION OF THE PREFERRED EMBODIMENTS

A preferred embodiment of this invention will now be described with reference to the accompanying drawings.

Figure 1:
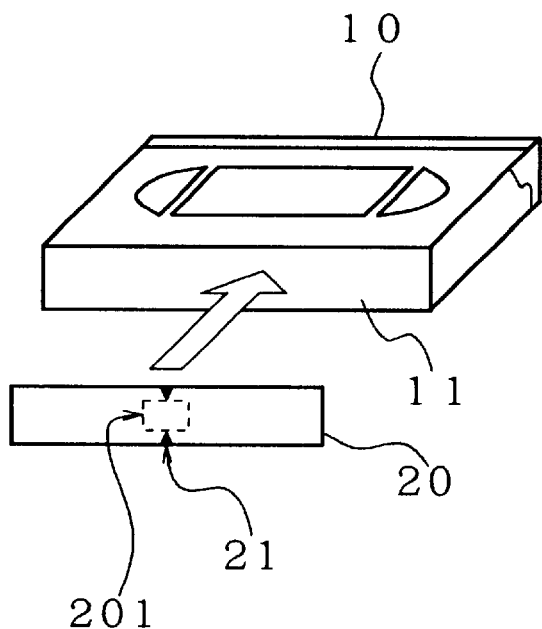
FIG. 1 is a schematic view of a video cassette to which a memory card is attached.

FIG. 1 is a schematic view of a video cassette 10. To a concave part 11 of the video cassette 10 is attached illustratively a non-contact type memory card 20 (simply called the memory card hereunder) as an auxiliary memory. The memory card 20 as memory means has an antenna position indication 21 for determining the position of an antenna 201, to be described later.

Figure 2:
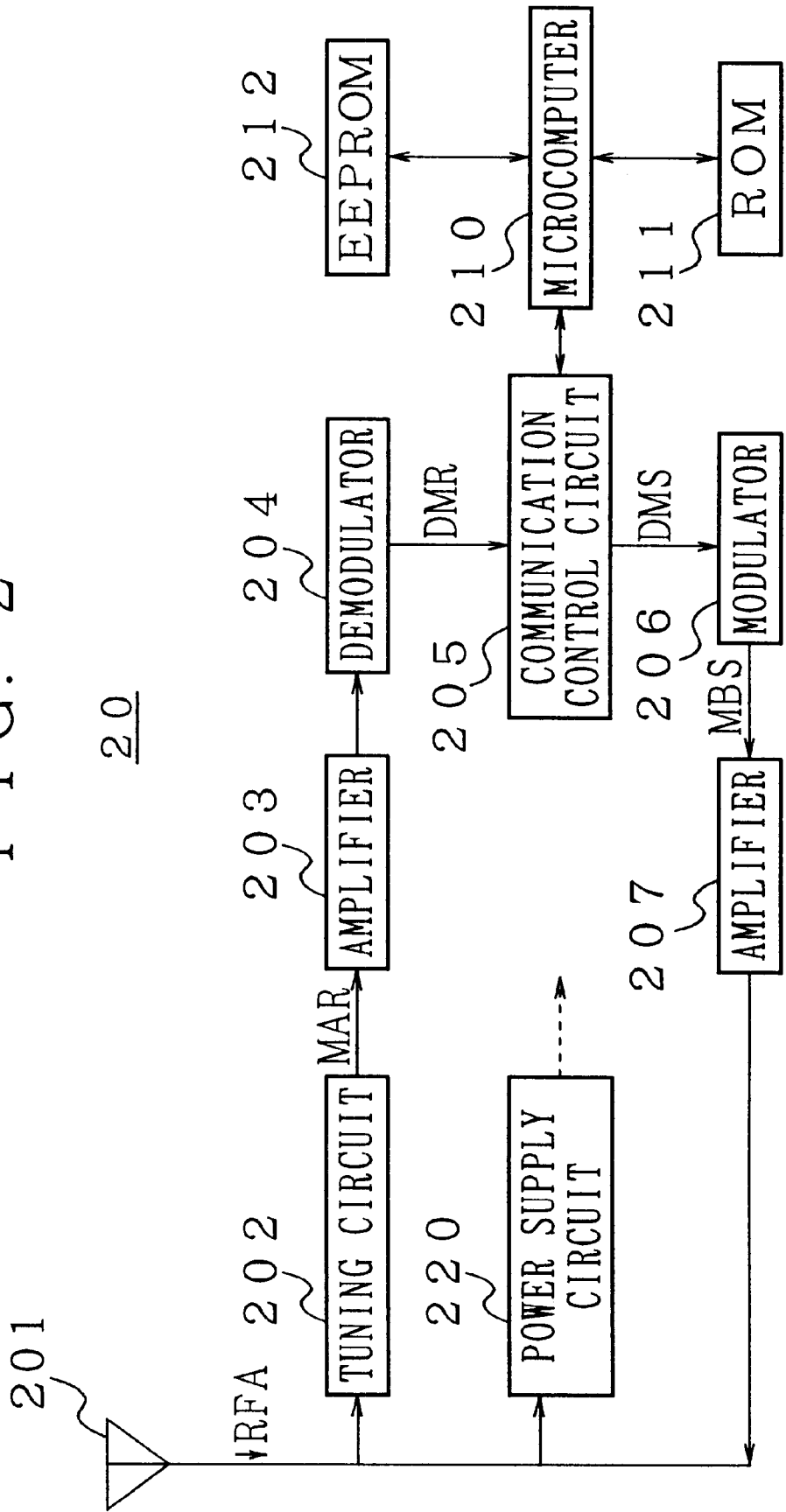
FIG. 2 is a schematic block diagram of the memory card.

The memory card 20 is structured as depicted in FIG. 2. The antenna 201 as communication means receives radio waves from an antenna 41a or 41b that serves as communication means of a video tape recorder 30, to be described later. A signal RFA received via the antenna 201 is supplied to a tuning circuit 202 and a power supply circuit 220. The tuning circuit 202 selects a modulated signal MAR having a predetermined carrier frequency out of the signal RFA sent from the antenna 201. The modulated signal MAR acquired by the tuning circuit 202 is amplified by an amplifier 203 up to a predetermined level before being fed to a demodulator 204. The demodulator 204 demodulates the modulated signal MAR to obtain a received data signal DMR. The received data signal DMR is supplied to a microcomputer 210 via a communication control circuit 205.

The microcomputer 210 is connected to a ROM (read only memory) 211. Using control programs stored in the ROM 211, the microcomputer 210 controls various parts of the memory card 20. The microcomputer 210 is also connected to an EEPROM (electrically erasable and programmable read only memory) 212. The memory 212 stores information about programs (dates of recordings, recording start times, channel numbers, recorded program positions, etc.) contained in the received data signal DMR. When information is read from the EEPROM 212 by the microcomputer 210 to generate a transmitted data signal DMS, the generated signal DMS is fed to a modulator 206 via the communication control circuit 205.

The modulator 206 modulates the transmitted data signal DMS thus supplied into a signal MBS having a predetermined carrier frequency. The modulated signal MBS obtained by the modulator 206 is amplified by an amplifier 207 up to a signal level sufficiently high for communication before being forwarded to the antenna 201. In turn, the antenna 201 transmits the modulated signal MBS at the carrier frequency.

The power supply circuit 220 generates electric power by exploiting electromagnetic coupling between the antenna 201 on the one hand and the antenna 41a or 41b of the video tape recorder 30 on the other hand. The power thus generated is used by the memory card 20.

Figure 3:
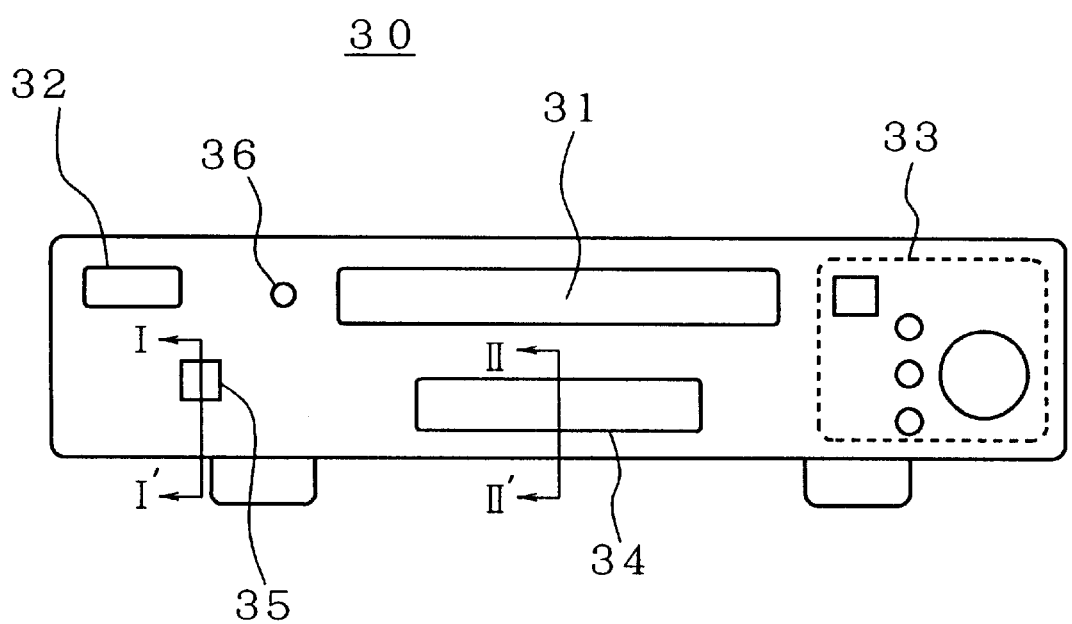
FIG. 3 is an external view of the recording medium processing apparatus, namely, a video tape recorder of the invention.

FIG. 3 is an external view of the video tape recorder 30. A front panel of the video tape recorder 30 has a loading port 31 through which a video cassette can be loaded, a power switch 32, an operation input part 33 for switching video tape recorder operations, and a display unit 34 for displaying operation status and related data. Also furnished are an antenna marking 35 indicating where the antenna 41a is located inside the front panel of the video tape recorder 30, and a communication indicator 36 indicating whether communication is in progress with the memory card 20 of a video cassette by use of the antenna 41a.

Whereas the memory card 20 is powered for its activity and for communication through electromagnetic coupling, the power is not available if the antenna 201 of the memory card 20 is not correctly aligned with the antenna 41a or 41b of the video tape recorder 30. To ensure communication between the antenna 201 of the memory card 20 and the antenna 41a of the video tape recorder 30 requires manually positioning the video cassette 10 close to the video tape recorder 30 using the antenna marking 35 (reference element) at the front panel in such a manner that the antenna 201 of the memory card 20 is faced with the antenna 41a inside the front panel.

Figure 4:
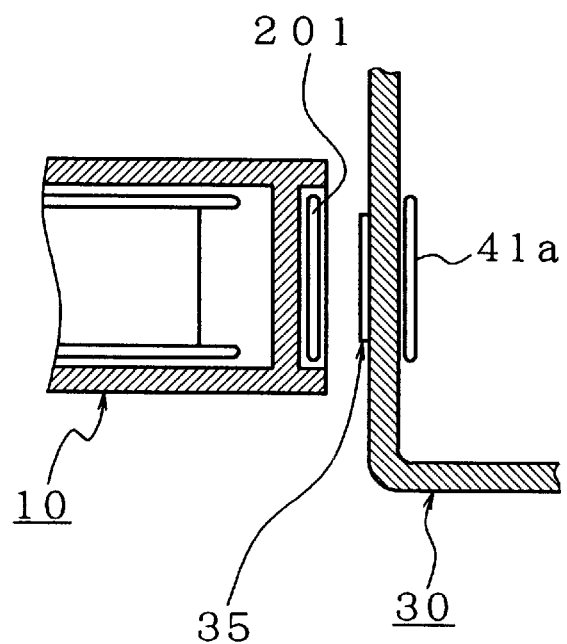
FIG. 4 is a schematic cross-sectional view taken along line I-I' of FIG. 3.

FIG. 4 is a schematic cross-sectional view taken along line I-I' of FIG. 3, showing how the video cassette 10 is positioned manually close to the video tape recorder 30. As shown in FIG. 4, the use of the antenna marking 35 makes it easy to position the antenna 201 of the memory card 20 face to face with the antenna 41a of the video tape recorder 30. Electric power used for communication and the activity of the memory card 20 is tapped from electromagnetic coupling between the antennas 201 and 41a.

Figure 5:
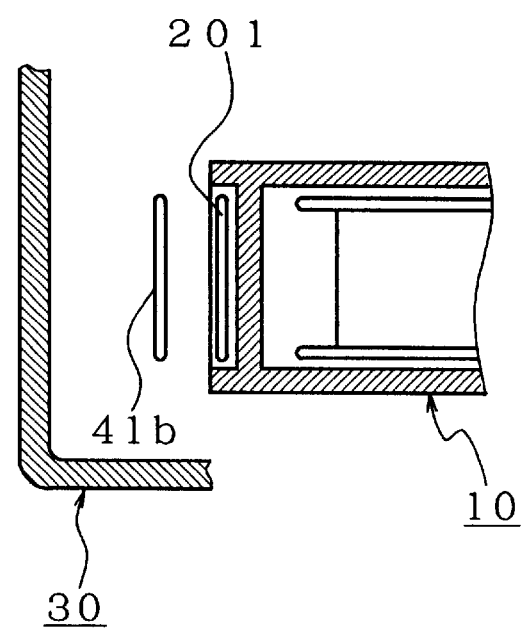
FIG. 5 is a schematic cross-sectional view taken along line II-II' of FIG. 3.

FIG. 5 is a schematic cross-sectional view taken along line II-II' of FIG. 3. When the video cassette 10 is loaded in the video tape recorder 30 as depicted in FIG. 5, the antenna 201 of the memory card 20 is faced with the antenna 41b inside the video tape recorder 30. Thus the electric power used by the memory card 20 for its activity and for communication is tapped from electromagnetic coupling between the antennas 201 and 41b.

Figure 6:
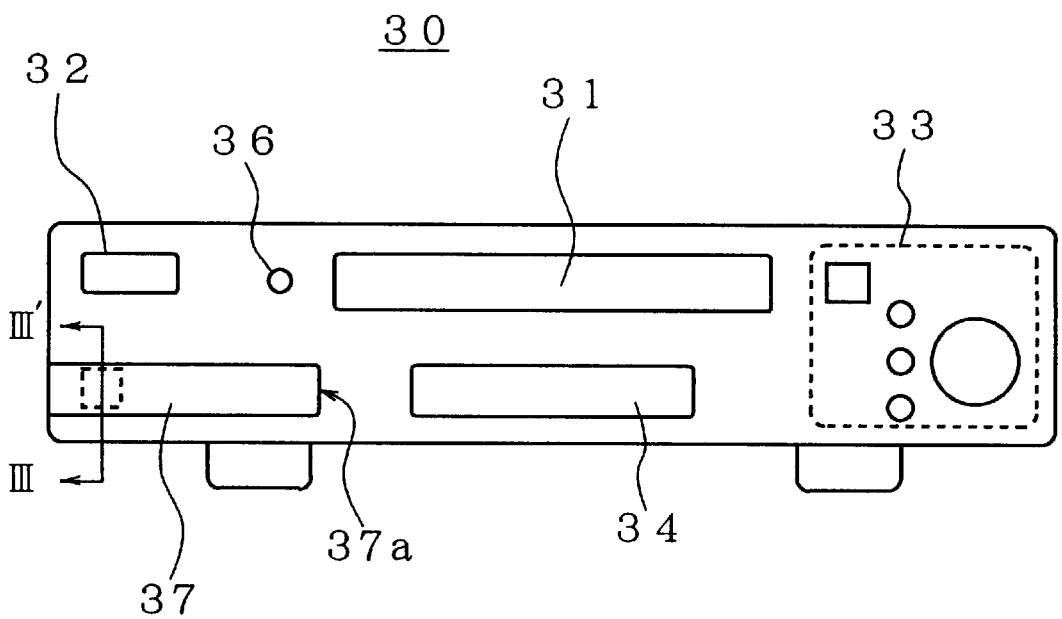
FIG. 6 is an external view of another recording medium processing apparatus, namely, video tape recorder, of the invention.

The antenna marking 35, as described above, is used to position manually the video cassette 10 close to the video tape recorder 30 so as to align the antennas 201 and 41a. Alternatively, a concave part 37 may be formed as another reference element at the front panel of the video tape recorder 30, as illustrated in FIG. 6.

The concave part 37 is made slightly wider than the height of the video cassette 10. The antenna 41a is located inside the front panel where the concave part 37 is formed. The antenna 41a is located in such a manner that, when the video cassette 10 is so positioned manually as to let one of its edges contact an edge 37a of the concave part 37, the antenna 41a comes face to face with the antenna 201 of the memory card 20.

Figure 7:
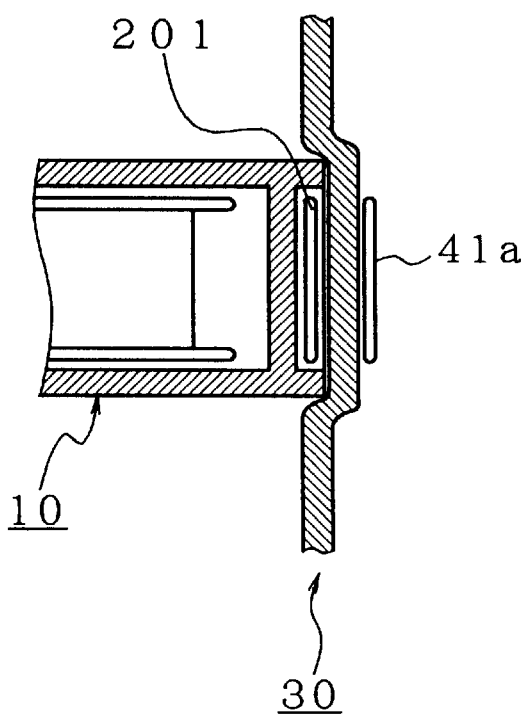
FIG. 7 is a schematic cross-sectional view taken along line III-III' of FIG. 6.

FIG. 7 is a schematic cross-sectional view taken along line III-III' of FIG. 7. As shown in FIG. 7, the antennas 201 and 41a are aligned correctly by simply positioning the video cassette 10 manually close to a suitable location where the concave part 37 is formed. This ensures communication and provision of electric power.

There may be a case where a card type memory such as an IC card is equipped with the same circuits and antennas for data transmission and reception as those of the memory card 20. That card type memory may be used illustratively to store booking information about programs to be recorded and to supply the information to the video tape recorder 30. In such a case, a concave part may be formed so as to conform to the shape of the card type memory. As is the case with the video cassette 10, the concave formation to accommodate the card type memory also makes it easy to align the antennas.

When both the memory card 20 attached to the video cassette 10 and the card type memory are used to communicate information, separate concave parts may be formed to conform to the shapes of the respective memories. Alternatively, a single concave part 38 maybe formed so as to conform simultaneously to the shapes of both the memory card 20 of the video cassette 10 and the card type memory, with the antenna 41a being shared. An area 38a of the concave part 38 corresponds to the memory card of the video cassette 10; an area 38b corresponds to the card type memory.

Figure 9:
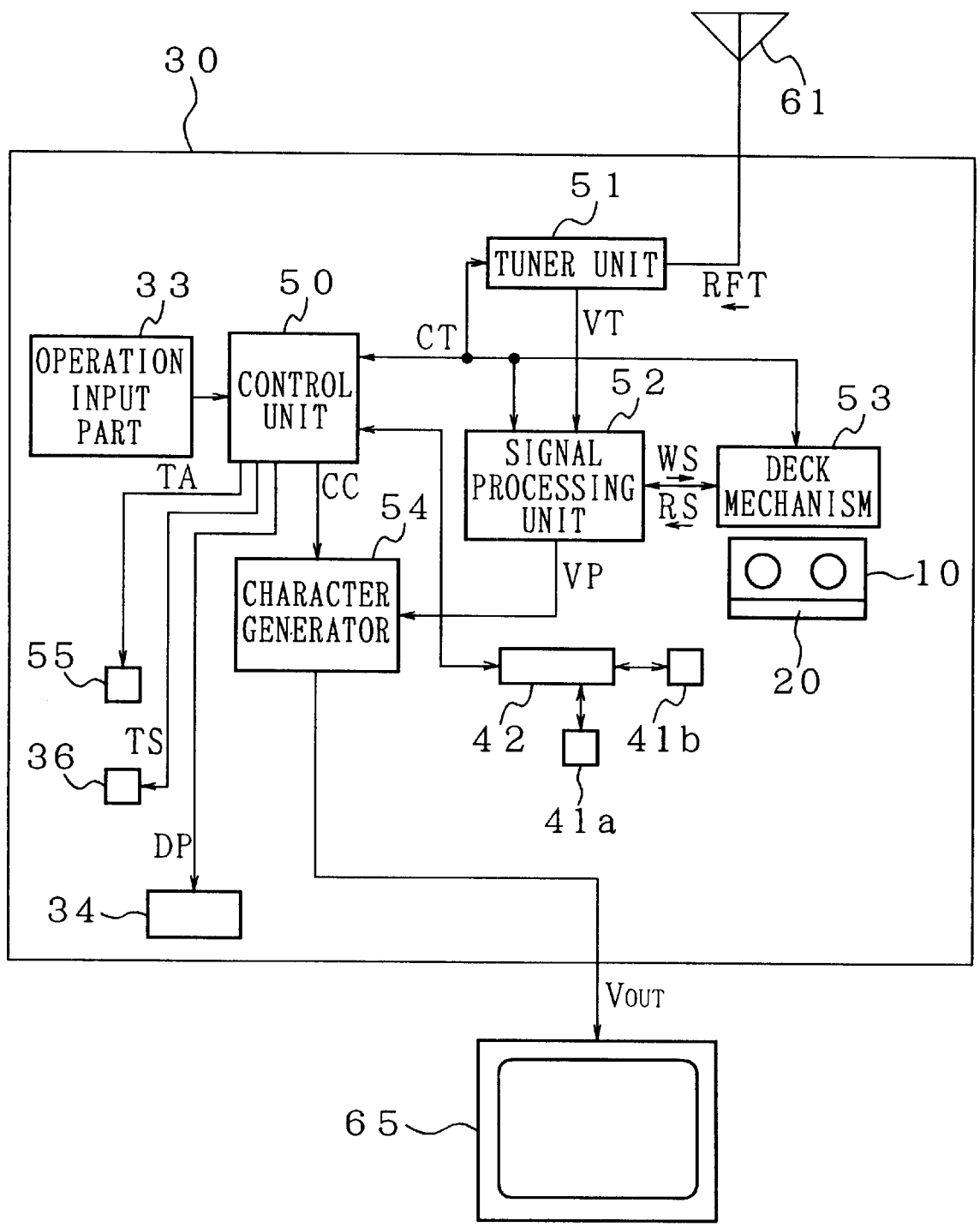
FIG. 9 is a schematic block diagram of the video tape recorder.

FIG. 9 is a schematic block diagram of the video tape recorder 30. The antennas 41a and 41b inside the video tape recorder 30 are connected to a transmission and reception processing unit 42 constituting part of the communication means of the invention. The transmission and reception processing unit 42 is connected to a control unit 50 made of a microcomputer constituting another part of the communication means. Communication takes place between the memory card 20 and the control unit 50. The transmission and reception processing unit 42, the antennas 41a and 41b, and the control unit 50 make up communicating means of this invention.

Figure 10:
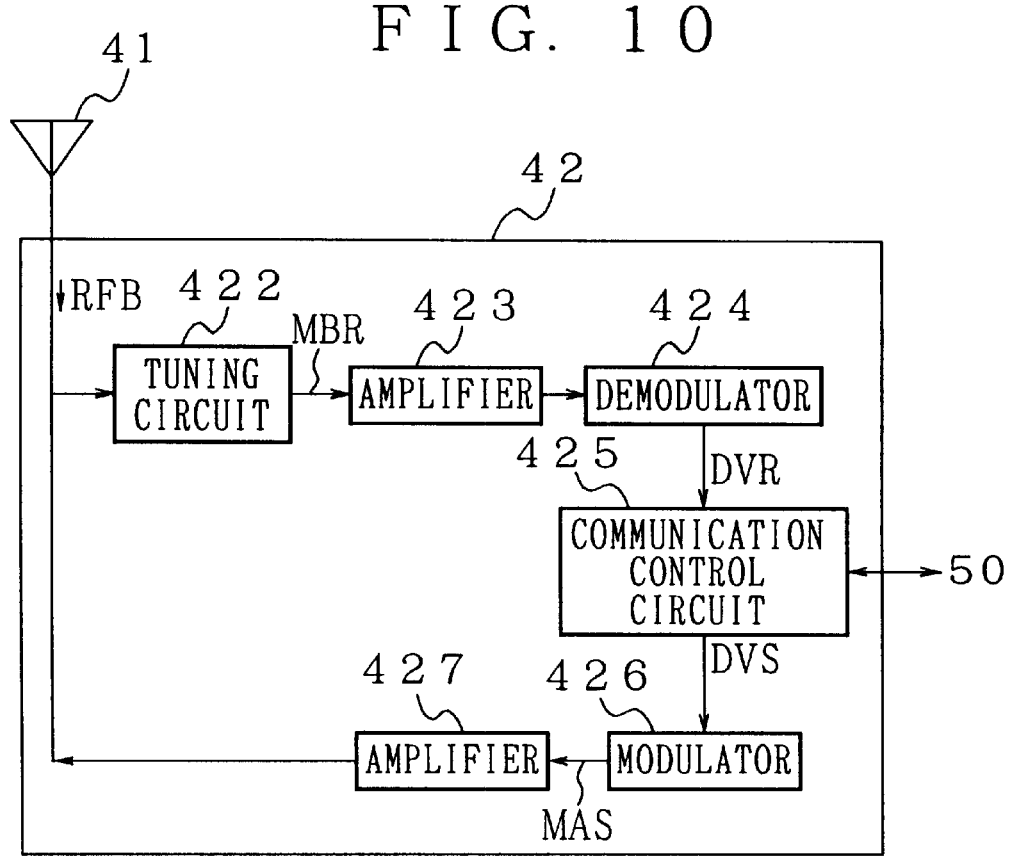
FIG. 10 is a schematic block diagram of communication means, namely, a transmission and reception processing unit.

FIG. 10 is a schematic block diagram of the transmission and reception processing unit 42. Using the antenna 41a or 41b, the unit 42 receives radio waves coming from the antenna 201 of the memory card 20. The signal RFB received via the antenna 41a or 41b is supplied to a tuning circuit 422.

The tuning circuit 422 selects a modulated signal MBR having a predetermined carrier frequency out of the received signal RFB. The modulated signal MBR obtained by the tuning circuit 422 is amplified by an amplifier 423 up to a predetermined level before being fed to a demodulator 424. The demodulator 424 demodulates the modulated signal MBR to acquire a received data signal DVR. The received data signal DVR is supplied to the control unit 50 via a communication control circuit 425.

The control unit 50 provides a transmitted data signal DVS containing information about programs. The transmitted data signal DVS is fed to a modulator 426 via the communication control circuit 425.

The modulator 426 modulates the transmitted data signal DVS to obtain a signal MAS having a predetermined carrier frequency. The modulated signal MAS acquired by the modulator 426 is amplified by an amplifier 427 up to a signal level sufficiently high for communication before being sent to the antenna 41a or 41b. The antenna 41a or 41b then transmits the modulated signal MAS at the carrier frequency.

A signal RFT is obtained when broadcast radio waves are received by an antenna 61 shown in FIG. 9. The signal RFT is fed to a tuner unit 51. The tuner unit 51 selects broadcast waves having a specific frequency to generate a video signal VT. The video signal VT is supplied to a signal processing unit 52. The signal processing unit 52 processes the video signal VT into a write signal WS. The write signal WS is fed to a deck mechanism 53. In the deck mechanism 53, a rotary head (not shown) records the write signal WS to a video tape in the video cassette 10.

When the video tape is played back, a reproduced signal RS is sent from the deck mechanism 53 to the signal processing unit 52. The signal processing unit 52 processes the reproduced signal RS to generate a reproduced video signal VP. The reproduced video signal VP is supplied to a character generator 54.

The character generator 54 constituting part of the control means of this invention generates a video signal VC based on a control signal CC from the control unit 50. Said video signal VC is used to display information about programs. The character generator 54 and the control unit 50 make up the control means. In the character generator 54, the generated video signal VC is multiplexed with the reproduced video signal VP from the signal processing unit 52. The resulting signal from the character generator 54 is a video output signal VOUT that is output by the video tape recorder 30. Alternatively, the reproduced video signal VP and selected components of the generated video signal VC are multiplexed to make up a video output signal VOUT that comes out of the video tape recorder 30. The video output signal VOUT is supplied to a display device 65. In turn, the display device 65 displays reproduced images and information that denotes programs.

The control unit 50 of the video tape recorder 30 generates a control signal CT for controlling the tuner unit 51, signal processing unit 52 and deck mechanism 53. At the same time, the control unit 50 performs communication with the memory card 20 attached to the video cassette 10. Furthermore, the control unit 50 generates the control signal CC based on the received data signal DVR from the transmission and reception processing unit 42. The control unit 50 is connected to the operation input part 33 that allows the video tape recorder 30 to be switched in operation. The switching of tape recorder operations may be carried out alternatively by use of a remote controller or like device over a telephone line. A display signal DP is sent from the control unit 50 to the display unit 34. Given the signal DP, the display unit 34 indicates operation status and related data.

The communication indicator 36 constituting part of the indicating means connected to the control unit 50 gives an indication, based on an indication control signal TS, about communication status at the antenna 201 of the memory card 20 and at the antenna 41a of the video tape recorder 30.

Illustratively, the communication indicator 36 is composed of a light-emitting diode that lights or blinks to indicate whether communication is in progress or is terminated. obviously, the display unit 34 may double alternatively as the indicating means displaying the communication status.

An audio output unit 55 connected to the control unit 50 outputs a sound regarding the communication status at the antennas 201 and 41a on the basis of an audio signal TA from the control unit 50. Illustratively, the audio output unit 55 is composed of a buzzer that sounds upon completion of communication. The audio output unit 55 constitutes part of the indicating means.

Figure 11:
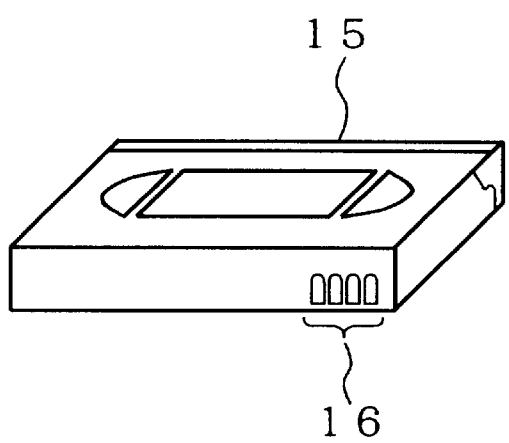
FIG. 11 is a schematic view of a video cassette integrated with a cassette memory.
Figure 8:
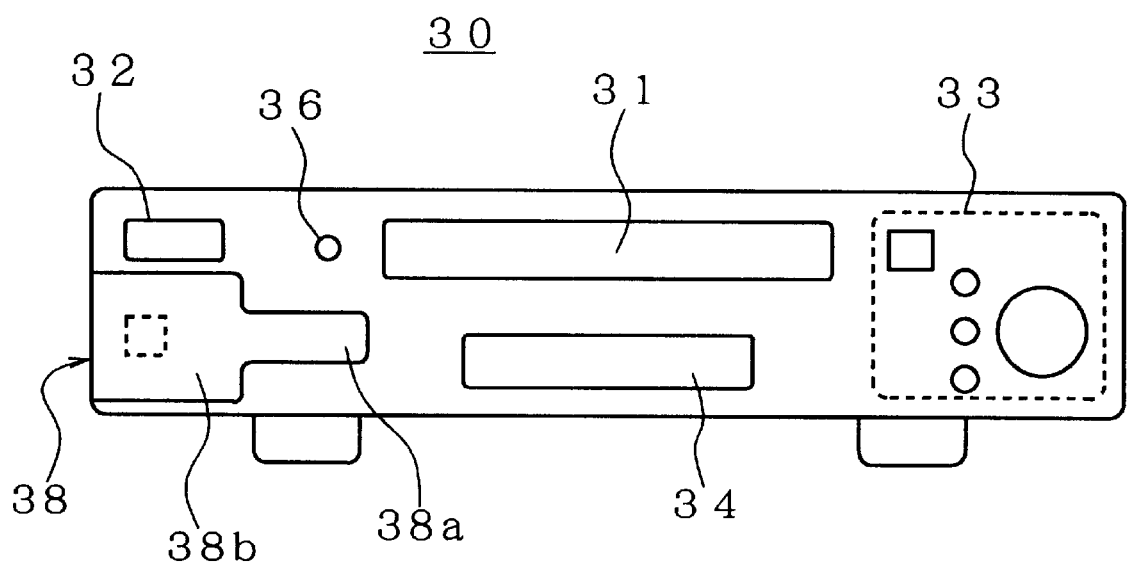
FIG. 8 is an external view of still another recording medium processing apparatus, namely, the video tape recorder of the invention.

Although the memory card 20 is attached to the video cassette 10 as its auxiliary memory in the above embodiments, this is not limitative of the invention. Another type of memory such EEPROM may be placed as an auxiliary memory or a built-in cassette memory into the video cassette. Such a video cassette 15 comprising a cassette memory has a contact part 16 for communication, as illustrated in FIG. 11. Where the video cassette 15 is to be used by the video tape recorder 30, the latter should have a terminal part for connection with the contact part 16 of the cassette. That terminal part is connected to the control unit 50.

In the video tape recorder 30 of the above constitution, under the signals from the control unit 50, the program information including the recorded position information about programs recorded on a video cassette is stored on the auxiliary memory of that video cassette. When any one of the programs recorded on the video cassette is to be selected, the program information is read from the auxiliary memory of the cassette. On the basis of the program information thus retrieved, the control signal CC is generated and supplied to the character generator 54. Given the control signal CC, the character generator 54 generates the video signal VC for information display and sends the generated signal to the display device 65. In turn, the display device 65 displays on its screen the information about the programs.

The display device 65 also displays a blank tape portion based on the information read from the auxiliary memory of the video cassette. Specifically, a display "BLANK TIME" appears on the screen indicating the longest available blank portion of the tape based on the recorded positions of the programs deemed no longer needed and on that portion of the tape which is judged unrecorded.

The embodiment of the invention works as follows: Programs are recorded successively on the video cassette 10. At the end of each of the recorded programs and upon completion of the recording operation, program information about the recorded program positions is stored successively into the memory card 20 of the video cassette 10.

If any of the programs recorded on the video cassette 10 is regarded as unnecessary, the program information about that program is erased from the memory card 20. When a new program is recorded, program information about the newly accommodated program is stored into the memory card 20. At the same time, that portion of the recorded program position information which concerns any overlapping recordings is erased. If a new program is overwritten onto a previously recorded program to such an extent that the already recorded program becomes shorter than a predetermined period of time (e.g., 15 minutes) in duration, then the program information about that old program is erased from the memory card 20.

The program information kept in the memory card 20 is retrieved for the display onto the display device 65 on three occasions: (a) when the video cassette 10 is positioned manually close to the video tape recorder 30 to get the antenna 201 of the memory card 20 faced with the antenna 41a of the video tape recorder 30; (b) when the video cassette 10 is loaded into the video tape recorder 30; or (c) when program search mode is selected by the operation input part 33 or remote controller of the video tape recorder 30 in order to select programs from those recorded on the video cassette 10.

FIG. 12 is a flowchart of steps in which the video cassette 10 is positioned manually close to the video cassette recorder 30 to read program information from the memory card 20.

In step ST1 of FIG. 12, a signal for prompting the information to be read from the memory card 20, e.g., an address signal denoting positions at which the information is recorded, is modulated and transmitted via the antenna 41a.

In step ST2, a check is made to judge whether the signal representing the information is received by the antenna 41a. When the video cassette 10 is not positioned manually close to the video tape recorder 30, no signal carrying the information is fed to the antenna 41a and then step ST2 is reached again. When the video cassette 10 is manually positioned close to a suitable location of the video cassette recorder 30, relevant parts of the memory card 20 on the video cassette 10 are powered. On the basis of the signal prompting information retrieval, which is received from the antenna 41a, program information is read from the memory card 20 and transmitted via the antenna 201. The signal sent from the antenna 201 is received by the antenna 41a. Hence comes the judgment that the signal representing the information has been received, and step ST3 is reached. In step ST3, all program information in the memory card 20 is read out. Step ST3 is followed by step ST4.

In step ST4, a check is made to judge whether all program information has been read out without error. When any error is detected in step ST4, step ST1 is reached again; when no error is detected, step ST5 is reached.

In step ST5, a check is made to judge whether the video tape recorder 30 is turned off. When the video tape recorder 30 is found to be turned off, the machine is turned on in step ST6 before step ST7 is reached. When the video tape recorder 30 is judged to be on in step ST5, step ST7 is reached immediately.

In step ST7, the display device 65 displays a manual positioning-prompted display screen based on the program information and related data from the memory card 20. This completes the manual positioning-prompted display operation.

While the program information is being read, the communication indicator 36 as shown in FIG. 9 indicates communication status. When all program information has been retrieved and displayed in the form of the manual positioning-prompted display screen, the audio output unit 55 outputs a sound verifying the end of the manual positioning-prompted display operation.

Figure 13A:
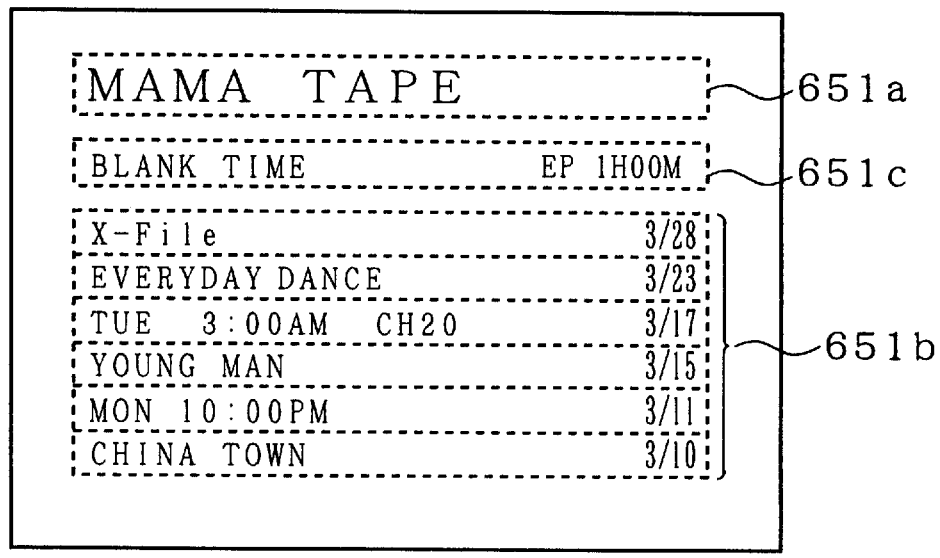
FIGS. 13A and 13B are schematic views of typical display screens on a display device.

FIG. 13A shows a typical manual positioning-prompted display screen. A tape title is displayed in a tape title display area 651a on the basis of the program information retrieved from the memory card 20. A program display area 651b on the screen displays program information about the programs recorded on the video cassette 10. On a single page of the manual positioning-prompted display screen, illustratively up to six program titles and their recording dates are displayed chronologically to permit easy verification of the programs recorded on the video cassette 10. The subsequent page or pages of the screen are called up by operating a suitable key on the operation input part 33 or remote controller of the video tape recorder 30. A blank display area 651c indicates under the title "BLANK TIME" the maximum available recording time on the video tape in accordance with the program information.

Figure 14:
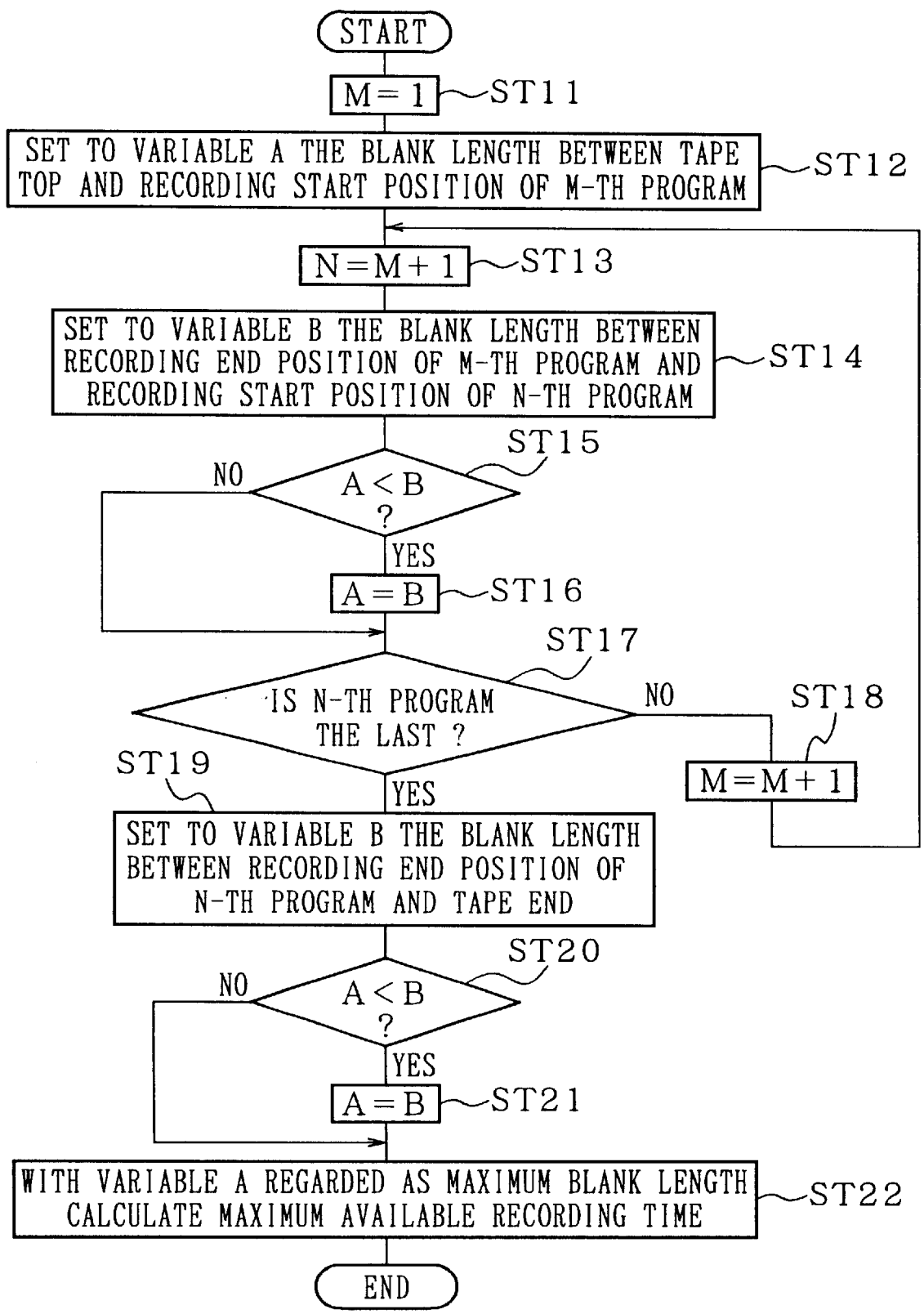
FIG. 14 is a flowchart of steps in which a maximum available recording time is calculated.

FIG. 14 is a flowchart of steps in which a maximum available recording time is calculated. In step ST11, a variable M is set to 1. Then step ST12 is reached.

In step ST12, recorded program position information included in the program information read from the memory card 20 is used as the basis for calculating a blank length between the tape top and the recording start position of an M-th program from the tape top. The blank length thus calculated is set to a variable A.

In step ST13, the variable M is incremented by 1 and the newly established value is set to a variable N. Step ST13 is followed by step ST14.

In step ST14, a blank length is calculated between the recording end position of the M-th program from the tape top and the recording start position of an N-th program. The blank length thus calculated is set to a variable B, and step ST15 is reached.

In step ST15, the variable A is compared with the variable B. When the variable B is judged to be greater than the variable A, step ST16 is reached. When the variable B is not found to be greater than the variable A, step ST17 is reached.

In step ST16, the value of the variable B is set to the variable A. Step ST16 is followed by step ST17.

In step ST17, a check is made to judge whether the N-th program is the last recorded program, i.e., the program recorded the closest to the tape end. If the N-th program is not judged to be the last recorded program, step ST18 is reached in which the variable M is incremented by 1. With the newly incremented value of the variable M established, step ST13 is reached again. When the N-th program is found to be the last recorded program in step ST17, step ST19 is reached.

In step ST19, a blank length between the recording end position of the N-th program and the tape end is calculated. The blank length thus calculated is set to the variable B. Step ST19 is followed by step ST20.

In step ST20, the variable A is compared with the variable B. If the variable B is judged to be greater than the variable A, step ST21 is reached. If the variable B is not found to be greater than the variable A, step ST22 is reached.

In step ST22, the value of the variable A is established as the maximum blank length. The maximum available recording time is calculated on the basis of that maximum blank length and of a currently selected recording mode of the video tape recorder 30 (e.g., either standard recording mode or long-playing recording mode). This completes the processing of FIG. 14.

The maximum available recording time varies with the recording mode in effect. The screen thus displays the calculated maximum available recording time corresponding to the currently selected recording mode that is also indicated. When recording modes are switched by the operation input part 33 or remote controller of the video tape recorder 30 (constituting mode setting means), the maximum available recording time is again calculated according to the newly selected recording mode. The newly provided recording time is then displayed corresponding to the newly established recording mode that is also indicated.

The manual positioning-prompted display screen is terminated in two cases: when an operation key different from the keys for feeding pages or for switching recording modes is operated, or when a predetermined period of time has elapsed with no operation carried out.

In the manner described, simply positioning the video cassette 10 manually close to a suitable location of the video tape recorder 30 causes the display device 65 automatically to display information about programs recorded on the video cassette 10. The programs recorded on the video cassette 10 are thus easily known without having to load the cassette into the video tape recorder 30. With one video cassette 10 after another positioned manually close to a suitable location of the video tape recorder 30, the display unit 34 of the tape recorder allows the user to find out easily which video cassette is needed to videotape a new program in its entirety based on the maximum available recording time displayed on the small display area of the unit 34; there is no need to utilize the display device 65. When a tape title is displayed on the display unit 34 for each video cassette, it is easy to find the video cassette containing the desired program without recourse to the display device 65.

Figure 13B:
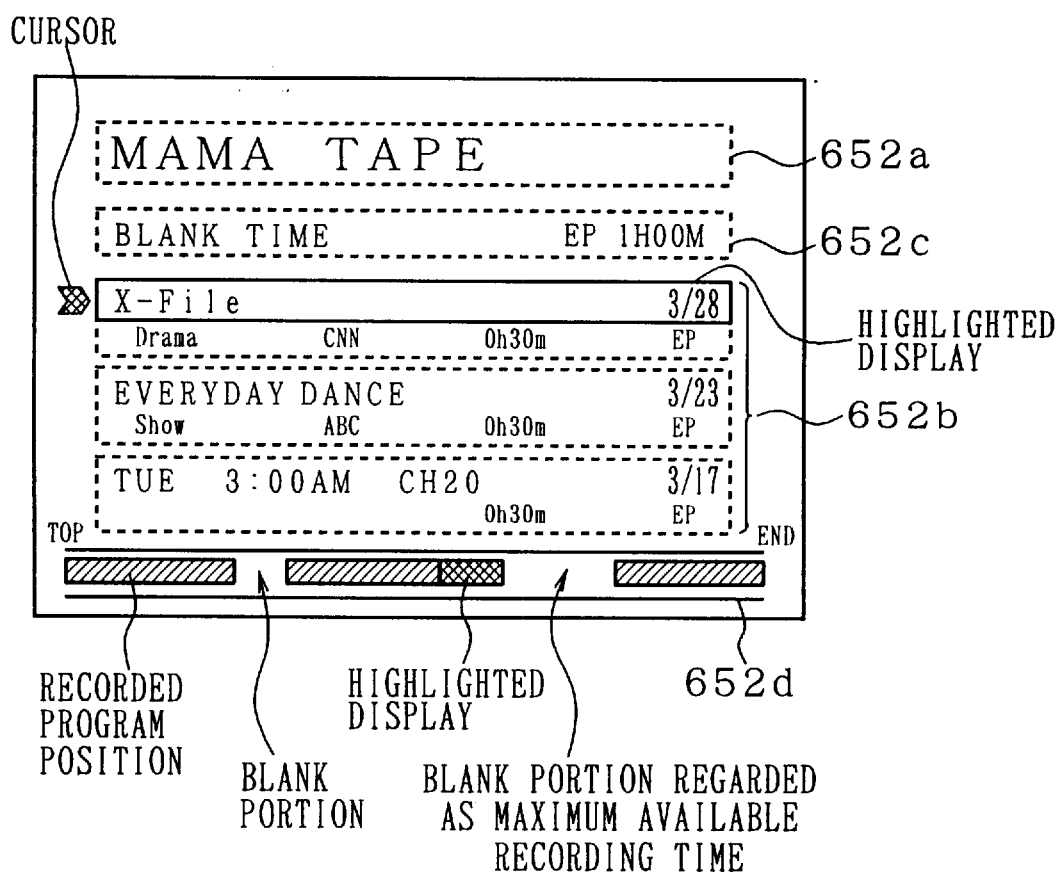

Program information is read from the memory card 20 via the antenna 41b and displayed as a program search screen on the display device 65 when the video cassette 10 is loaded into the video tape recorder 30, or when, with the video cassette 10 loaded in the video tape recorder 30, the operation input part 33 or remote controller of the video tape recorder 30 is operated to select program search mode in which programs recorded on the video cassette 10 are selected. FIG. 13B shows a typical program search screen that appears on the display device 65.

A tape title display area 652a on the program search screen displays a tape title. A program display area 652b indicates the information about the programs recorded on the video cassette. In addition to program titles and their recording dates, the program search screen also displays program categories, broadcasting station names, recording time periods and recording modes. When the program titles are not stored, then the days of the week on which programs are recorded, their recording start times, and the relevant channel numbers are displayed. As is the case with the manual positioning-prompted display screen, a blank display area 652c indicates a maximum available recording time along with a recording mode.

The program search screen also includes a tape bar display 652d indicating recorded program positions on the tape. When a program is selected with a cursor moved on the screen by operation of the operation input part 33 or remote controller, the program pointed to by the cursor is highlighted for distinction from the other program indications. Highlighting typically involves changing colors and/or brightness of the selected program title and the corresponding date of recording, or giving the indications in question in a three-dimensional fashion. The tape bar display 652d also highlights the recorded position of the cursor-indicated program (shown shaded in FIG. 13B) for distinction from the recorded positions of the other programs.

When the cursor is set to the position of the blank display area 652c, that area is highlighted. At the same time, in the tape bar display 652d, the longest available blank portion has its display attributes changed for distinction from the other blank tape portions. For example, an external frame of that position of the tape bar display which corresponds to the longest available blank portion is changed in color.

When a video cassette 10 to which a memory card 20 is attached is loaded in the video tape recorder 30, with the information from the memory card 20 being referenced or edited on the screen, the transmission or reception of information about any other video cassette via the antenna 41a is halted.

In this manner, the maximum available record time can be displayed correctly when the video cassette 10, with the memory card 20 being attached thereto, is brought close to the video tape recorder 30 or when a video cassette having the auxiliary memory device is loaded to the video tape recorder 30, whereby it is readily possible to estimate as to whether the intended broadcast can be recorded on that video cassette. Moreover, in case the blank section from the position of the end of recording of a broadcast up to the position of tape end is short, when there is a long intermediate blank section or a long record area of a broadcast that is judged to be negligible, this blank section is counted in the available record time, whereby it is possible to record broadcasts efficiently. The displays of maximum available record time as shown in FIGS. 13A and 13B are solely exemplary, and thus the invention is not restrictive thereto.

Although in the foregoing embodiment, the memory card 20 is attached on the video cassette 10 and the video tape recorder 30 is designed to write on the memory card 20 the broadcast information of the broadcasts which are recorded on the video cassette 10 and read the information out of the memory card 20, the information carrying apparatus is not confined to the video cassette 10, with the memory card 20 being attached on it, and the video tape recorder 30 which uses a card-type memory device, but instead, it can be an apparatus which uses a disc-type recording medium or the like, obviously.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for determining a maximum available continuous record time on a recording medium, said method comprising the steps of:
   calculating the lengths of a plurality of blank sections, including blank sections interspersed with recorded sections, if any, on said recording medium;
   comparing the calculated lengths to determine which section is the longest;
   determining a record time for the longest section; and
   displaying the record time determined for the longest section as the maximum available continuous record time of the recording medium;
   whereby the display of the maximum available continuous record time enables a user to rapidly determine if the recording medium has enough continuous blank recording space anywhere on the recording medium to record a desired program of a known duration.

2. The method according to claim 1, wherein said blank sections include positions where no events are recorded and positions where events that have been judged to be negligible are recorded.

3. The method according to claim 2, said method comprising the additional steps of:
   recording on memory means which is integrated on said recording medium or the casing enclosing said recording medium, event information inclusive of information on the record positions of events recorded on said recording medium; and
   reading said event information out of said memory means and detecting said blank sections based on the event information.

4. The method according to claim 3, wherein the event information of said event is deleted from said memory means when the event recorded on said recording medium is judged to be negligible.

5. The method according to claim 3, wherein a recording medium processing apparatus which records or reproduces events on said recording medium reads said event information out of said memory means when said recording medium is brought close to said recording medium processing apparatus; and said method comprising the additional step of displaying said read event information as the maximum available record time.

6. The method according to claim 3, wherein a recording medium processing apparatus which records or reproduces events on said recording medium reads said event information out of said memory means when said recording medium is loaded to said recording medium processing apparatus; and said method comprising the additional step of displaying said read event information as the maximum available record time.

7. The method according to claim 3, wherein a recording medium processing apparatus which records or reproduces events on said recording medium reads said event information out of said memory means when said recording medium is loaded to said recording medium processing apparatus and a predetermined operation is carried out; and said method comprising the additional step of displaying said read event information as the maximum available record time.

8. The method according to claim 3, wherein said recording medium comprises a video tape and said memory means is provided on the video cassette which encloses said video tape.

9. The method according to claim 3, wherein said recording medium comprises a video tape and said memory means is formed inside the video cassette which encloses said video tape.

10. The method according to claim 3, wherein said recording medium comprises a magnetic disc and said memory means is formed on said disc.

11. The method according to claim 3, wherein when a new event is recorded over an event recorded on said recording medium, event information of said already recorded event is altered.

12. The method according to claim 11, wherein when said already recorded event is shortened below a predetermined time due to the overwriting, event information of said already recorded event is deleted from said memory means.

13. The method according to claim 7, wherein said predetermined operation is to commence the search of an event.

14. The method according to claim 5, wherein said recording medium processing apparatus has a standard recording mode and a long-time recording mode, and calculates and displays the maximum available record time depending on the selected mode.

15. The method according to claim 14, wherein said recording medium processing apparatus displays the selected mode together with the maximum available record time.

16. The method according to claim 5, wherein said recording medium processing apparatus displays the maximum available record time on the front display section.

17. The method according to claim 6, wherein said recording medium processing apparatus has a standard recording mode and a long-time recording mode, and calculates and displays the maximum available record time depending on the selected mode.

18. The method according to claim 17, wherein said recording medium processing apparatus displays the selected mode together with the maximum available record time.

19. The method according to claim 6, wherein said recording medium processing apparatus displays the event record positions and the blank sections in a bar graph fashion.

20. The method according to claim 19, wherein said recording medium processing apparatus displays the blank section corresponding to the maximum available record time in a fashion different from that of other blank sections.

21. The method according to claim 7, wherein said recording medium processing apparatus has a standard recording mode and a long-time recording mode, and calculates and displays the maximum available record time depending on the selected mode.

22. The method according to claim 21, wherein said recording medium processing apparatus displays the selected mode together with the maximum available record time.

23. The method according to claim 7, wherein said recording medium processing apparatus displays the event record positions and the blank sections in a bar graph fashion.

24. The method according to claim 23, wherein said recording medium processing apparatus displays the blank section corresponding to the maximum available record time in a fashion different from that of other blank sections.

25. A recording medium processing apparatus for recording or reproducing events on a recording medium, comprising:

control means for: calculating the lengths of a plurality of blank sections, including blank sections interspersed with recorded sections, if any, on said recording medium; comparing the calculated lengths to determine which section is the longest; and, determining a record time for the longest section; and display means for displaying the record time determined for the longest section as the maximum available continuous record time of the recording medium;

whereby the display of the maximum available continuous record time enables a user to rapidly determine if the recording medium has enough continuous blank recording space anywhere on the recording medium to record a desired program of a known duration.

26. The apparatus according to claim 25, wherein said control means treats as blank sections the positions where no events are recorded and the positions where events that have been judged to be negligible are recorded.

27. The apparatus according to claim 26 comprising further communication means, said communication means communicating the event information inclusive of information on the record positions of events recorded on said recording medium with memory means which stores the event information; and wherein said control means determines the blank sections based on the event information read out of said memory means.

28. The apparatus according to claim 27, wherein said memory means is integrated on said recording medium or the casing enclosing said recording medium.

29. The apparatus according to claim 27, wherein when the event recorded on said recording medium is judged to be negligible, said apparatus deletes the event information of said event from said memory means.

30. The apparatus according to claim 27, wherein said communication means implements the communication in a non-conduct manner.

31. The apparatus according to claim 30, wherein said apparatus includes in the front interior thereof an antenna for the communication, said communication means communicating with said memory means when said recording medium is brought close to said antenna.

32. The apparatus according to claim 30 comprising further an antenna for the communication located in the interior of the insertion port for loading said recording medium; and wherein said communication means communicates with said memory means when said recording medium is put into said insertion port.

33. The apparatus according to claim 30 further comprising:

a first antenna for the communication in the front interior thereof; and a second antenna for the communication inside the insertion port for loading said recording medium;

wherein said communication means communicates with said memory means by using said first antenna when said recording medium is brought close to said first antenna;

wherein said communication means communicates with said memory means by using said second antenna when said recording medium is put into said insertion port, with the communication by use of said first antenna being inhibited during the communication by use of said second antenna.

34. The apparatus according to claim 31 comprising further detection means for detecting the state of power supply to said apparatus; and wherein said apparatus turns on the power supply when said detection means detects that the power supply is turned off in the case that said recording medium is brought close to said antenna.

35. The apparatus according to claim 25 comprising further mode setting means for setting a recording mode of said recording medium; and wherein said control means calculates the maximum available record time depending on the recording mode set by said mode setting means.

36. The apparatus according to claim 27 comprising further mode setting means for setting a recording mode of said recording medium; and wherein said control means calculates the maximum available record time depending on the recording mode set by said mode setting means.

37. The apparatus according to claim 35, wherein said control means display the maximum available record time on the front display section of said apparatus.

38. The apparatus according to claim 37, wherein said control means displays the event recording positions and blank sections in a bar graph fashion on said display means.

39. The apparatus according to claim 38, wherein said apparatus displays the blank section corresponding to the maximum available record time in a fashion different from that of other blank sections.

40. The apparatus according to claim 25 wherein indications of recorded events on said recording medium are stored in memory and displayed on said display means, and, when a new event is overwritten over at least a portion of an already recorded event on said recording medium, event information of the already recorded event is altered; and when said already recorded event is shortened below a predetermined time due to the overwriting, event information of said already recorded event is no longer displayed.

* * * * *